(12) United States Patent
Miao et al.

(10) Patent No.: US 12,043,175 B2
(45) Date of Patent: Jul. 23, 2024

(54) TRAILER REAR CAMERA SENSING MECHANISMS AND METHODS

(71) Applicant: GM GLOBAL TECHNOLOGY OPERATIONS LLC, Detroit, MI (US)

(72) Inventors: Yun Qian Miao, Waterloo (CA); Halit Zengin, Bowmanville (CA); Akram M. Abdel-Rahman, Ajax (CA); Todd W. Nelson, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 272 days.

(21) Appl. No.: 17/517,838

(22) Filed: Nov. 3, 2021

(65) Prior Publication Data

US 2023/0137098 A1    May 4, 2023

(51) Int. Cl.
| | |
|---|---|
| *B60R 1/00* | (2022.01) |
| *B60D 1/62* | (2006.01) |
| *B60R 11/04* | (2006.01) |
| *B60T 7/20* | (2006.01) |
| *B60T 8/24* | (2006.01) |
| *B60W 30/08* | (2012.01) |
| *G06V 20/56* | (2022.01) |

(52) U.S. Cl.
CPC ................ *B60R 1/002* (2013.01); *B60T 7/20* (2013.01); *B60T 8/248* (2013.01); *B60W 30/08* (2013.01); *G06V 20/588* (2022.01); B60D 1/62 (2013.01); B60R 11/04 (2013.01); B60R 2300/80 (2013.01); B60T 2230/06 (2013.01)

(58) Field of Classification Search
CPC ..... B60R 1/002; B60R 11/04; B60R 2300/80; B60T 7/20; B60T 8/248; B60T 2230/06; B60T 8/1708; B60W 30/08; G06V 20/588; B60D 1/62; B60D 1/30
See application file for complete search history.

(56) References Cited

U.S. PATENT DOCUMENTS

| | | | |
|---|---|---|---|
| 9,026,311 B1 * | 5/2015 | Pieronek | B60T 8/1708 280/455.1 |
| 2018/0061239 A1 * | 3/2018 | Prasad | G01S 13/867 |
| 2021/0023997 A1 * | 1/2021 | Vasoya | B60D 1/36 |
| 2021/0114422 A1 * | 4/2021 | Goodarzi | B60D 1/24 |

\* cited by examiner

*Primary Examiner* — Jacob M Amick
*Assistant Examiner* — Charles J Brauch
(74) *Attorney, Agent, or Firm* — Quinn IP Law

(57) ABSTRACT

Systems for detecting movement of a trailer having a rearward facing camera and linked to a tow vehicle. The systems include taking a first image and a second image with the camera and comparing the images. A first amount of trailer movement is determined between the second image and the first image. The systems may also take additional images and determine a second amount of trailer movement occurring between the additional images. Tracking the first amount and the second amount of trailer movement determines an amount of trailer sway. The determined trailer sway may be compared to a maximum allowable sway and, if the movement is greater than the maximum allowable sway, mitigating sway of the trailer with the tow vehicle.

9 Claims, 3 Drawing Sheets

TRAILER REAR CAMERA SENSING MECHANISMS AND METHODS

INTRODUCTION

The present disclosure relates to methods, mechanisms, and systems for determining movement of a trailer attached to a tow vehicle.

SUMMARY

A method and systems for detecting movement of a trailer having a rearward facing camera, which is linked to a tow vehicle, are provided. Portions or parts of the systems operate by taking a first image with the camera and taking a second image with the camera. The second image and the first image may be compared, and a first amount of trailer movement determined between the second image and the first image.

The systems may also take a third image and a fourth image with the camera and compare the fourth image to the third image. The comparison may be used to determine a second amount of trailer movement occurring between the fourth image and the third image. By tracking the first amount and the second amount of trailer movement the systems determine an amount of trailer sway.

The systems may compare the determined trailer sway to a maximum allowable sway and, if the movement is greater than the maximum allowable sway, mitigate sway of the trailer with the tow vehicle. Mitigating sway of the trailer may involve the tow vehicle executing one or more of differential braking, active rear steering, active front steering, or braking with the trailer.

The systems may use one, or both, of a front camera or sensors of the tow vehicle to determine whether movement of the trailer is in response to movement of the tow vehicle. If movement of the trailer is in response to movement of the tow vehicle, not mitigating sway, even if the movement of the trailer is greater than the maximum allowable sway.

In some configurations, the methods and systems may determine the location of one or more lane markings in the first image and determine or estimate the location of the trailer relative to the one or more lane markings in the first image. Similarly, the methods and systems may determine the location of one or more lane markings in the second image and determine or estimate the location of the trailer relative to the one or more lane markings in the second image. These locations may be used to determine a second amount of trailer movement occurring relative to the lane markings between the second image and the first image.

In some configurations, the methods and systems may determine a lateral velocity and a forward velocity of the camera from the captured images. The determined lateral velocity and the determined forward velocity of the camera may be used to determine or estimate a trailer length of the trailer.

The above features and advantages and other features and advantages of the present disclosure are readily apparent from the following detailed description of the best modes for carrying out the disclosure when taken in connection with the accompanying drawings.

DETAILED DESCRIPTION

Figure 1:
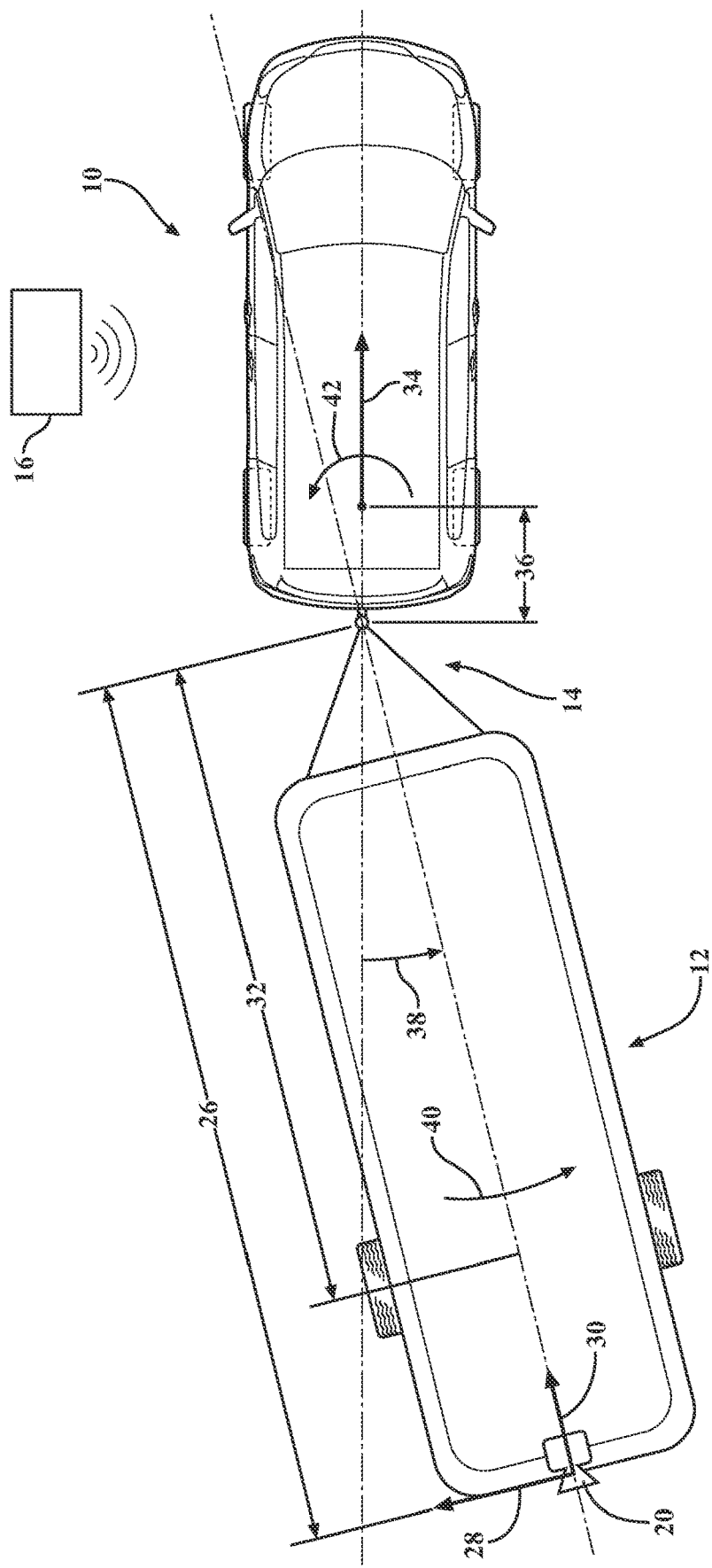
FIG. 1 is a schematic diagram of a tow vehicle pulling a trailer.

Referring to the drawings, like reference numbers refer to similar components, wherever possible. All figure descriptions simultaneously refer to all other figures. FIG. 1 schematically illustrates a tow vehicle 10, shown highly schematically, which may be, for example and without limitation, a conventional, an electric vehicle, or a hybrid-electric vehicle. The tow vehicle 10, and its systems, are capable of detecting movement of a trailer 12, which is connected by a hitch structure, or simply hitch 14, to the tow vehicle 10.

A control system or controller 16 is operatively in communication with necessary components of, at least, the tow vehicle 10 and the trailer 12 to execute the methods, algorithms, and health assessments described herein. The controller 16 includes, for example and without limitation, a non-generalized, electronic control device having a preprogrammed digital computer or processor, a memory, storage, or non-transitory computer-readable medium used to store data such as control logic, instructions, lookup tables, etc., and a plurality of input/output peripherals, ports, or communication protocols. The controller 16 is configured to execute or implement all control logic or instructions described herein.

Furthermore, the controller 16 may include, or be in communication with, a plurality of sensors, including, without limitation, those configured to sense or estimate ambient temperature outside of the tow vehicle 10, various coolant temperatures within the tow vehicle 10, and other sensing capabilities. The controller 16 may be dedicated to the specific aspects of the tow vehicle 10 described herein, or the controller 16 may be part of a larger control system that manages numerous functions of the tow vehicle 10.

The drawings and figures presented herein are diagrams, are not to scale, and are provided purely for descriptive and supportive purposes. Thus, any specific or relative dimensions or alignments shown in the drawings are not to be construed as limiting. While the disclosure may be illustrated with respect to specific applications or industries, those skilled in the art will recognize the broader applicability of the disclosure. Those having ordinary skill in the art will recognize that terms such as "above," "below;" "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way. Any use of the term, "or," whether in the specification or claims, is inclusive of any specific element referenced and also includes any combination of the elements referenced, unless otherwise explicitly stated.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

All numerical values of parameters (e.g., of quantities or conditions) in this specification, including the appended claims, are to be understood as being modified in all instances by the term about whether or not the term actually appears before the numerical value. About indicates that the stated numerical value allows some slight imprecision (with some approach to exactness in the value: about or reasonably close to the value: nearly). If the imprecision provided by about is not otherwise understood in the art with this ordinary meaning, then about as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments.

When used, the term "substantially" refers to relationships that are ideally perfect or complete, but where manufacturing realties prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans will recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

The tow vehicle 10 may have a communications system that is capable of sharing information determined by the controller 16, for example, or other parts of the tow vehicle 10 with locations outside of the tow vehicle 10. For example, and without limitation, the communications system may include cellular or Wi-Fi technology that allows signals to be sent to centralized locations, such as clouds or communications networks. It is envisioned that the methods and mechanisms described herein may occur on the tow vehicle 10, in a cloud system, a combination of both, or via other computational systems, such that the controller 16, or functions thereof, may be executed externally to the tow vehicle 10.

The trailer 12 has a rearward facing camera 20 installed thereon, generally at the end of the trailer 12, relative to normal direction of movement of the tow vehicle 10. The camera 32 is linked to, or in communication with, the tow vehicle 10 and related systems. The camera 20 is configured to take a series of images and compare those images, such as with the controller 16 or other systems of the tow vehicle 10, such that the images are used to determine, at least, a first amount and a second amount of trailer 12 movement occurring between the images. Furthermore, the camera 20 may be taking video, such that the images may be frames of the video.

One or more successive images are compared to determine movement and trailer sway. By comparing at least two images, the system may determine the relative amount of movement of the camera 20 between the at least two images based on the location of portions of the compared images. As one very basic example, and without limitation, the camera 20 may capture the location of a tree or another vehicle in consecutive images and, by comparing the location of the tree or other vehicle in the images, determine the amount of movement of the camera 20, and the trailer 12, between the images.

The determined trailer 12 movement may be either lateral, left-to-right, or longitudinal, up-and-down, movement. Therefore, the systems may be determining the amount of lateral movement, longitudinal movement, or both, of the trailer 12.

By comparing multiple images from the camera 20 and multiple instances of determined movement of the trailer 12, such as first movement and second movement, the systems may be able to determine trailer sway, which is when the trailer 12 is moving, or oscillating, laterally behind the tow vehicle 10. Trailer sway may be determined relative to previous locations or relative to lane markings on the road over which the trailer 12 and tow vehicle 10 are moving. The position of the trailer 12 may also be graphed or tracked over time, such as with a signal sent to the controller 16, and sway determined based on that signal or comparisons of peaks thereof. Irrespective of measurement or marking type, excessive trailer sway may need to be mitigated by the tow vehicle 10, the trailer 12, or both.

The methods employed to determine movement of the trailer 12 may also include determining the location of one or more lane markings in the captured images from the camera 20. The lane markings may then be used to determine the amount of trailer 12 movement, or trailer sway, occurring relative to the lane markings in the captured images. Note that comparison of one or more images may be used with, or without, lane markings, such that the methods may simply compare the images to determine movement, may compare the location of the lane markings to determine movement, or both.

Figure 3:
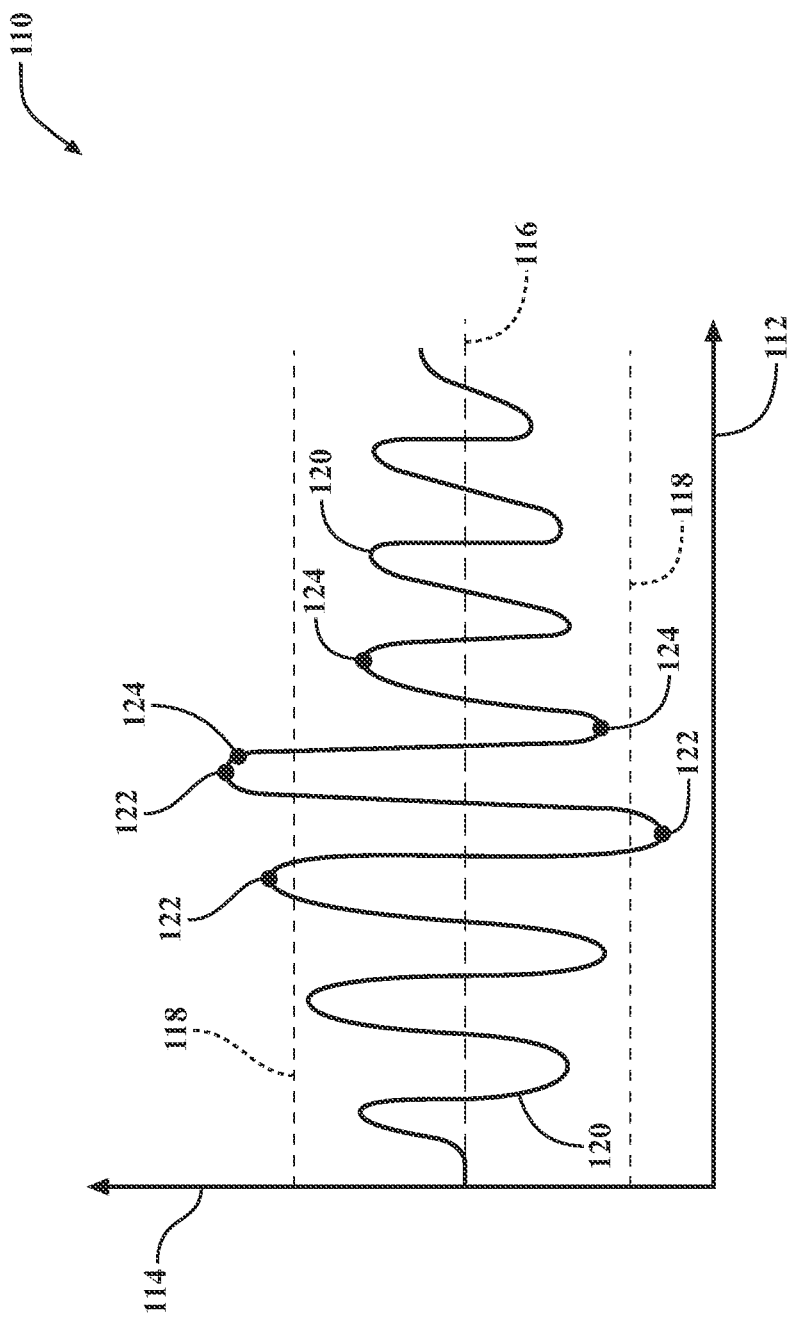
FIG. 3 is a schematic chart for illustrating tracking and mitigation of trailer sway.

In addition to determining movement, or sway, of the trailer 12, the systems described herein may also compare the determined trailer sway to a maximum allowable sway. If the movement is greater than the maximum allowable sway, the systems may mitigate sway of the trailer 12 with the tow vehicle 10, or with the trailer 12, itself. Examples of mitigating sway of the trailer 12 involve, for example, and without limitation, the tow vehicle 10 executing one or more of differential braking, active rear steering, and/or active front steering. Differential braking generally refers to braking the right side or the left side of the tow vehicle 10. In general, the mitigation techniques work to counteract the moment created by the swaying trailer 12 with a contradictory moment of the tow vehicle 10. Implementing one or more of the mitigation techniques is schematically illustrated in FIG. 3.

Note that, in some configurations, the trailer 12 may be capable of mitigating sway on its own. For example, and without limitation, the trailer 12 may be configured to execute trailer differential braking on its left side or right side to minimize sway after the systems have determined that excessive sway exists with the camera 20. Additionally, the trailer 12 may execute uniform braking to mitigate sway. Where the systems are also tracking longitudinal movement of the trailer 12, additional, and possibly different, mitigation strategies may be employed by the tow vehicle 10, as would be recognized by skilled artisans.

As schematically illustrated in FIG. 1, the methods and systems described herein may also be used to estimate the length of the trailer 12, when not known by the controller 16 or the tow vehicle 10. A trailer length 26, $L_c$, which is the distance from the hitch 14, may be determined based on movements of the camera 20 that are determined by the systems described herein.

The systems may determine a lateral velocity 28, $V_{cy}$, of the camera 20, which may also be referred to as the y velocity of the camera 20, from one or more of the captured images. Additionally, the systems may determine a forward velocity 30, Vex, of the camera 20, which may also be referred to as the x velocity of the camera 20, from one or more of the captured images. These velocities, with the addition of other data points and/or determinations, may be used to determine the trailer length 26 of the trailer 12.

As illustrated in FIG. 1, there are several other data points or calculations that may be made relative to the tow vehicle 10, the trailer 12, or both. A wheelbase length 32, $L_{tr}$, is the distance from the hitch 14 to the axle of the trailer 12. A rear axle velocity 34, $V_y$, of the tow vehicle 10 may be determined by wheel speed sensors, an inertial measurement unit (IMU), or other mechanisms recognizable to skilled artisans.

A hitch distance 36, $L_h$, is the distance from the rear axle of the tow vehicle 10 to the hitch 14 connection to the tow vehicle 10. In many cases, $L_h$ and $L_{tr}$ will be known. A hitch articulation angle 38, $\theta$, may be determined or estimated by, for example, and without limitation: direct measurement, a rear view camera on the tow vehicle 10, parking sensors, or a kinematic model. A trailer yaw rate 40, $\dot{\psi}_{tr}$, and a tow vehicle yaw rate 42, $\dot{\psi}_v$, may be determined by wheel speed sensors, the IMU, or other mechanisms.

Equations (1), (2), and (3), illustrate kinematic relationships of the above relative to the tow vehicle 10 and the trailer 12.

$$V_{cy} = L_c \dot{\psi}_{tr} \quad (1)$$

$$V_{cx} = L_h \sin\theta \, \dot{\psi}_v + V_y \cos\theta \quad (2)$$

$$\dot{\psi}_{tr} = \frac{1}{L_{tr}}(-L_h \cos\theta \, \dot{\psi}_v + V_y \cos\theta) \quad (3)$$

By combining Equations (1)-(3), we derive Equation (4).

$$L_c = \frac{V_{cy} L_{tr}}{-L_h \cos\theta \, \dot{\psi}_v + V_y \cos\theta} \quad (4)$$

The trailer length 26, $L_c$, may be determined by utilizing Equation (4) with an estimation algorithm—including, without limitation, least-squares, maximum likelihood, or gradient—when the kinematic model of Equation (3) is valid, which generally occurs when the tow vehicle 10 system speed is low, for example, with without limitation, less than 30 kilometers per hour.

Figure 2:
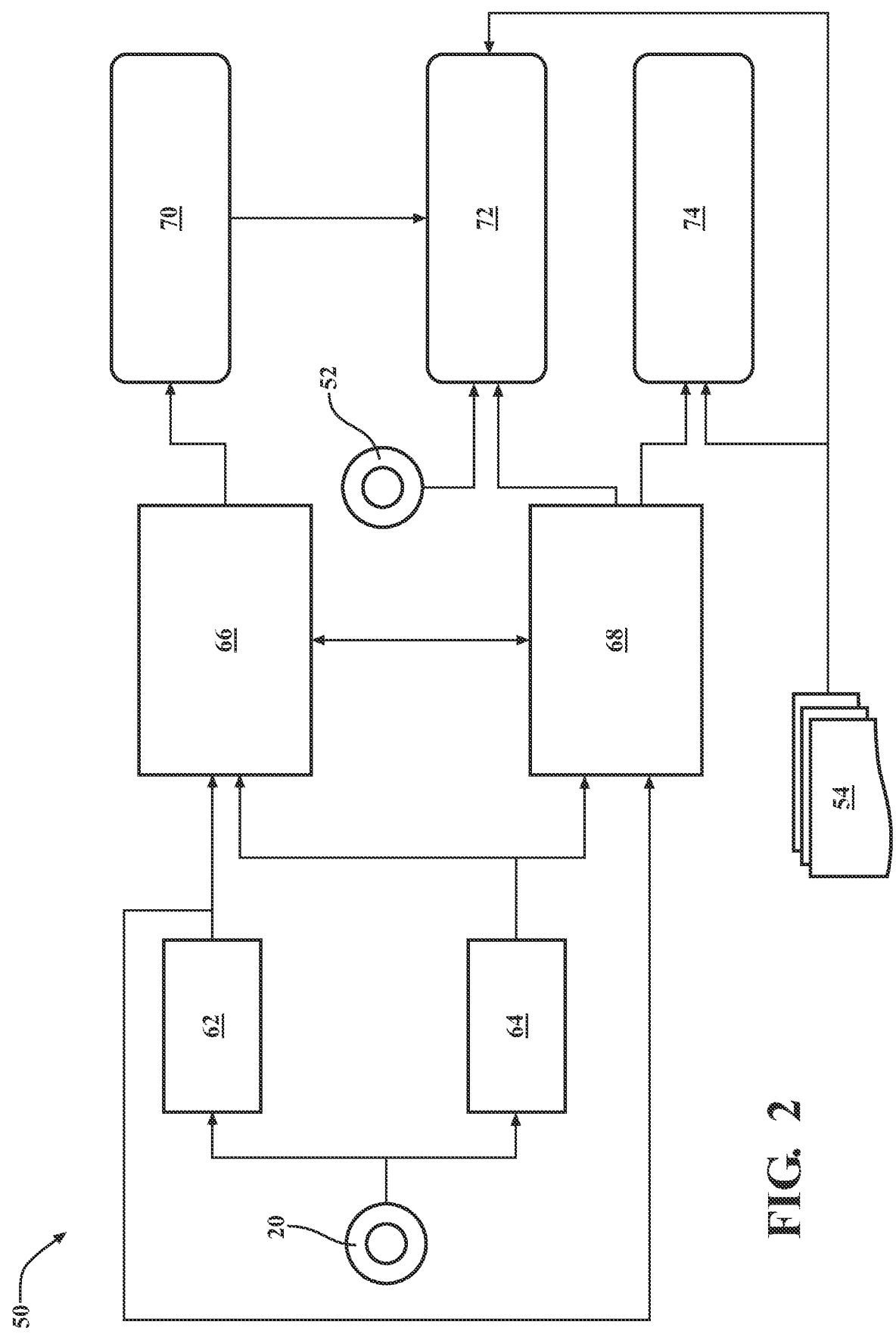
FIG. 2 is a schematic flow diagram illustrating logic for determining and mitigating trailer sway.

Referring now to FIG. 2, and with reference to the other figures, there is shown a flow diagram 50 schematically illustrating some of the logic involved in determining sway of the trailer 12 and, when preferred, mitigating that trailer sway. In many configurations, the tow vehicle 10 includes additional components contributing to the systems and methods described herein. For example, and without limitation, the tow vehicle 10 may include a front camera 52 and a plurality of motion sensors or vehicle sensors 54—including, without limitation, the IMU, accelerometers, and/or gyroscopes.

The systems may use either, or both, of the front camera 52 or the vehicle sensors 54 of the tow vehicle 10 to determine whether movement of the trailer 12 is in response to movement of the tow vehicle 10. For example, and without limitation, the tow vehicle 10 may be intentionally changing lanes or avoiding a road hazard, which may cause the systems to, otherwise, believe that the trailer 12 is swaying outside of its lane markings or is swaying more than the maximum allowable amount. However, if movement of the trailer 12 is in response to movement of the tow vehicle 10, the systems may not mitigate sway, even if the movement of the trailer 12 would be, otherwise, greater than the maximum allowable sway.

As schematically illustrated in FIG. 2, a current frame block 62 represents the most recent image taken by the camera 20 and a previous frame block 64 represents the next most recent image taken by the camera 20. Note that additional frames may be incorporated by the systems and methods described herein. A detect movement block 66 compares the current frame and the previous frame to determine the amount of movement of the trailer 12.

A detect lane markings block 68 finds the lane markings in one or more of the current frame and the previous frame. A sway detection block 70 uses either, or both, the detect movement block 66 and lane markings block 68, to determine the amount of trailer sway occurring in the trailer 12. As schematically illustrated in FIG. 3 and described herein, where the amount of trailer sway exceeds a maximum allowable sway, a trailer lane keeping block 72 may implement mitigation measures to reduce the amount of sway. Note that trailer lane keeping may be implemented even where trailer sway does not exceed maximum allowable sway amounts—because the trailer 12 may drift out of the lane, as measured by the lane markings, even when the trailer 12 is not swaying. A trailer length estimation block 74 uses the Equations (1)-(4) to estimate the length of the trailer 12.

The camera 20 is generally an addon feature to trailer 12, though it may be included with the tow vehicle 10. Therefore, as a user may be installing the camera 20 on the rear of the trailer 12, the camera 20 may not be installed on the exact center of the trailer 12.

To account for offsets of the camera 20, the systems may use a calibration input, or may estimate that the camera 20 is close enough to the center of the trailer 12. Note that determination of the magnitude of sway between images generally would not be affected by the camera 20 being slightly off center. Alternatively, the systems may include mechanisms or methods to determine placement of the camera 20 relative to the center of the trailer 12 based on, for example, and without limitation, the location of the lane markings or by other methods recognizable to skilled artisans.

Referring now to FIG. 3, and with reference to the other figures, there is shown a schematic movement or sway graph 110, which includes an x-axis 112, illustrating time passage, and a y-axis 114, illustrating relative position of the camera 20 and/or the back of the trailer 12. A zero line 116, which may be established through calibration or estimated as part of a startup process for the methods described herein illustrates a general center line for the trailer 12. Note that the zero line 116 may vary based on the intended path of the tow vehicle 10, the trailer 12, or both. The graph 110 also shows example maximum sway lines 118, which are representative of bounds beyond which the systems would prefer that the trailer 12 not sway. The maximum sway lines 118 may be representative of points within a lane, of sensed movement between images, or both.

A movement line 120 is schematically illustrative of the path of the trailer 12 relative to the zero line 116. One or more excursion points 122 are representative of areas in which the camera 20 and/or rear end of the trailer 12 has ventured beyond the maximum sway lines 118, such that mitigation may be warranted. Note that sway of the trailer 12 may also be detected by comparing, in particular, concurrent oscillation peaks, which are shown on the sway graph 110, or by detecting the growing rate of sway.

One or more mitigation points 124 representative of areas for which the systems have applied mitigative measures to slow, or reduce, swaying of the trailer 12 and bring it back, ideally, toward the zero line 116. Note that the mitigation points 124 are exemplary and that mitigation of trailer sway may not simply occur at the peaks of the movement line 120. To the contrary, mitigation may be occurring along additional portions of the movement line 120, such that trailer sway is mitigated at more than just the peaks. Furthermore, note that mitigation may occur earlier in the graph 110, such as whenever the movement line 120 exceeds the example maximum sway lines 118, or whenever the systems sense that the movement line 120 is likely to exceed the maximum sway lines 118.

The detailed description and the drawings or figures are supportive and descriptive of the subject matter herein. While some of the best modes and other embodiments have been described in detail, various alternative designs, embodiments, and configurations exist.

Furthermore, any embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of detecting movement of a trailer having a rearward facing camera and linked to a tow vehicle, further comprising:
    taking a first image with the camera;
    taking a second image with the camera;
    comparing the second image to the first image;
    determining a first amount of trailer movement occurring between the second image and the first image;
    taking a third image with the camera;
    taking a fourth image with the camera;
    comparing the fourth image to the third image;
    determining a second amount of trailer movement occurring between the fourth image and the third image;
    tracking the first amount and the second amount of trailer movement to determine a trailer sway;
    comparing the determined trailer sway to a maximum allowable sway;
    if the determined trailer sway is greater than the maximum allowable sway, mitigating the determined trailer sway with the tow vehicle;
    wherein mitigating the determined trailer sway involves the tow vehicle executing one or more of differential braking, active rear steering, or active front steering;
    using one or more of a front camera or sensors of the tow vehicle to determine whether the first amount or the second amount of trailer movement of the trailer is in response to movement of the tow vehicle; and
    if the first amount or the second amount of trailer movement of the trailer is in response to movement of the tow vehicle, not mitigating sway, even if the movement of the trailer is greater than the maximum allowable sway.

2. The method of claim 1, wherein the first amount of trailer movement is a first lateral amount of trailer movement, and further comprising:
    determining a first longitudinal amount of trailer movement occurring between the second image and the first image.

3. The method of claim 2, wherein the second amount of trailer movement is a second lateral amount of trailer movement, and further comprising:
    determining a second longitudinal amount of trailer movement occurring between the fourth image and the third image.

4. A method of detecting movement of a trailer having a rearward facing camera and linked to a tow vehicle, comprising:
    taking a first image with the camera;
    taking a second image with the camera;
    comparing the second image to the first image;
    determining a first amount of trailer movement occurring between the second image and the first image;
    taking a third image with the camera;
    taking a fourth image with the camera;
    comparing the fourth image to the third image;
    determining a second amount of trailer movement occurring between the fourth image and the third image;
    tracking the first amount and the second amount of trailer movement to determine a trailer sway;
    determining a lateral velocity of the camera from one or more of the first image, the second image, the third image, and the fourth image;
    determining a forward velocity of the camera from one or more of the first image, the second image, the third image, and the fourth image; and
    determining a trailer length of the trailer based upon the determined lateral velocity and the determined forward velocity of the camera.

5. The method of claim 4, wherein mitigating the determined trailer sway further includes trailer uniform braking or trailer differential braking.

6. A non-transitory computer-readable medium of including contents that are configured to cause a computing system to perform a method of detecting movement of a trailer having a rearward facing camera, the method comprising:
    taking a first image with the rearward facing camera;
    taking a second image with the rearward facing camera;
    comparing the second image to the first image;
    determining a first amount of trailer movement occurring between the second image and the first image;
    taking a third image with the rearward facing camera;
    taking a fourth image with the rearward facing camera;
    comparing the fourth image to the third image;
    determining a second amount of trailer movement occurring between the fourth image and the third image;
    tracking the first amount and the second amount of trailer movement to determine a trailer sway;
    comparing the determined trailer sway to a maximum allowable sway; and
    if the movement is greater than the maximum allowable sway, mitigating sway of the trailer with a tow vehicle attached to the trailer, wherein mitigating trailer sway of the trailer involves the tow vehicle executing one or more of differential braking, active rear steering, or active front steering;
    determining a location of one or more lane markings in the first image;
    determining a location of the trailer relative to the one or more lane markings in the first image;
    determining a location of one or more lane markings in the second image; and determining a location of the trailer relative to the one or more lane markings in the second image; and determining a second amount of trailer movement occurring relative to the lane markings between the second image and the first image.

7. The non-transitory computer-readable medium of claim 6, further comprising:

determining a lateral velocity of the rearward facing camera from one or more of the first image and the second image;

determining a forward velocity of the rearward facing camera from one or more of the first image and the second image; and determining a trailer length of the trailer based upon the determined lateral velocity and the determined forward velocity of the rearward facing camera.

8. The method of claim 4, further comprising: determining a location of one or more lane markings in the first image; and determining a location of the trailer relative to the one or more lane markings in the first image.

9. The method of claim 8, determining a location of one or more lane markings in the second image; and determining a location of the trailer relative to the one or more lane markings in the second image; and determining a second amount of trailer movement occurring relative to the one or more lane markings between the second image and the first image.

\* \* \* \* \*